UNITED STATES PATENT OFFICE.

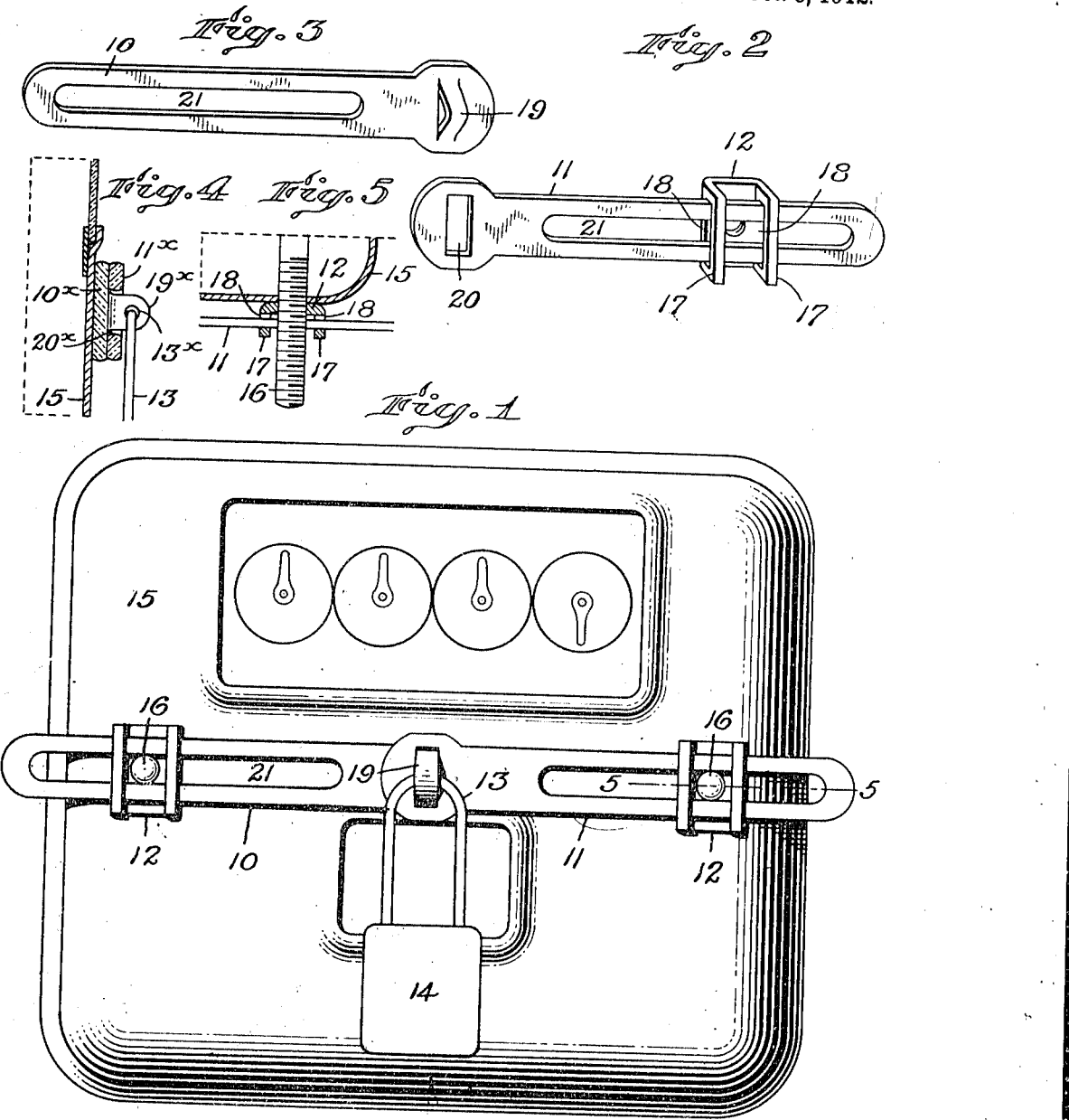

GRANVILLE E. PALMER, OF BROOKLINE, MASSACHUSETTS.

LOCKING DEVICE.

1,040,573.  Specification of Letters Patent.  Patented Oct. 8, 1912.

Application filed May 10, 1912. Serial No. 696,451.

*To all whom it may concern:*

Be it known that I, GRANVILLE E. PALMER, a citizen of the United States, and resident of Brookline, in the county of Norfolk and State of Massachusetts, have invented certain new and useful Improvements in Locking Devices, of which the following is a specification.

This invention relates to locking devices, and it is especially applicable to such devices as are commonly used for locking covers upon meters.

The invention, as illustrated by the accompanying drawings, is shown in connection with a meter for measuring electrical service, but it is not to be understood that the invention is thereby limited to that specific use.

Of the accompanying drawings which illustrate the invention: Figure 1 represents a front elevation of an electric meter the cover of which is locked in place by the device hereinafter explained. Fig. 2 represents a perspective view of two coöperative members of the device. Fig. 3 represents a perspective view of another member of the device, which is adapted to be interlocked with one of the members in Fig. 2. Fig. 4 represents a vertical section through the coupled portions of coupling members embodying a modification. Fig. 5 represents a horizontal section through the structure intersected by line 5—5 of Fig. 1.

The same reference characters indicate the same parts wherever they occur.

The locking device comprises two coactive members 10 and 11, and two specially constructed nuts 12, 12, which are locked against rotation by the members 10 and 11 respectively. A necessary adjunct to the locking device is means for holding the members 10 and 11 in interlocked relation, which adjunct is, however, not a part of the present invention. It is nevertheless illustrated by Figs. 1 and 4 and comprises a loop 13 and a seal which is represented conventionally at 14.

The cover of an electric meter is indicated at 15, and two screws for securing the cover to the meter are indicated at 16, 16. The meter itself does not appear on the drawings because it is concealed behind the cover 15, but it may be assumed that the inner ends of the screws 16 are suitably anchored to the meter and project through suitable holes in the cover sufficiently to receive the nuts 12 in the usual manner.

The function of the locking device is to lock the nuts 12 against rotation so that the cover cannot be removed and replaced without detection. The members 10 and 11 are formed with the locking portions in such manner that a single sealing device is sufficient to prevent rotation of both of the nuts. Each nut is formed with wings 17, and the wings are provided with slots 18 adapted to receive the members 10 and 11. The outer ends of the members 10 and 11 are the same in construction; but their inner ends, which are adapted to be interlocked with each other, are provided respectively with an ear 19 and a hole 20, the hole being adapted to receive the ear.

The device in the form shown by Figs. 1, 2 and 3 is composed of sheet metal, and the ear 19 is formed by striking up a portion in the form of a bridge or loop through which the loop 13 may be passed. The nuts 12 are likewise preferably made of sheet metal, because of the ease with which the ears 17 may be formed. The members 10 and 11 are provided with slots, indicated at 21, through which the screws 16 extend when the locking device is attached.

The device is applied to a meter in the following manner: After the cover has been placed over the screw 16 the members 10 and 11 are inserted separately in the nuts 12 in the relation shown, and the nuts, together with their locking members which are then separated from each other, are screwed upon the respective screws 16 until the nuts bind with the desired force upon the cover. The interlocking ends of the members 10 and 11 are then placed in such relation that the loop 19 projects through the hole 20. The loop 13 is then placed through the loop 19 and the ends thereof are sealed by the sealing member 14. The members 10 and 11 are adapted to be applied to any meter of which the screws 16 lie within the range of the slots 21, the locking members being free to slide with relation to the nuts as well as with relation to the screws. While the locking members 10 and 11 and the nuts 12 may be composed of any suitable ductile sheet metal, it is preferable to make them of aluminum because the extreme difficulty of soldering or otherwise joining two pieces of aluminum is so great as to defeat an attempt to conceal detection.

In the form shown by Fig. 4, the locking member indicated at 10ˣ and the complemental member indicated at 11ˣ are composed of glass. The member 10ˣ is provided with an ear 19ˣ, and the member 11ˣ is provided with an opening 20ˣ adapted to receive the ear. A hole 13ˣ in the ear is adapted to receive the loop 13 of a sealing device.

In each of the forms shown, the interlocking portions of the coupling members fit sufficiently closely to prevent sagging of the coupling members, and they are thereby supported in alinement with each other, thus improving the appearance of the device when attached.

I claim:

1. A device for locking a cover upon a meter or the like, comprising two detachable threaded members for engaging complemental threaded members of the meter to hold the cover on the meter, and two detachable coupling members, said coupling members and detachable threaded members being separable and having interlocking parts for preventing relative rotation of the latter members, said coupling members having complemental portions whereby they are adapted to be coupled with each other while interlocked with said detachable threaded members, the coupling portion of one coupling member having provision for the reception of a sealing device to seal the coupling members in coupled relation.

2. A device for locking a cover upon a meter or the like, comprising two detachable threaded members for engaging complemental threaded members of the meter to hold the cover on the meter, and two detachable coupling members, said coupling members and detachable threaded members having interlocking parts for preventing relative rotation of the latter members, said interlocking parts being adapted to enable the coupling members to slide toward and from each other, said coupling members having portions whereby they are adapted to be coupled with each other while interlocked with said detachable threaded members, the coupling portion of one coupling member having provisions for the reception of a sealing device to seal the coupling members in coupled relation.

3. A device for locking a cover upon a meter or the like, comprising two threaded members for holding the cover on the meter, and two detachable coupling members for preventing rotation of said threaded members, said threaded members having slots for the reception of said coupling members whereby the coupling members are interlocked respectively with the threaded members and whereby the coupling members are enabled to be adjusted toward and from each other, one of said coupling members having a projecting portion and the other having an opening through which said portion may be inserted, said portion having an opening through which a sealing device may be passed to seal the coupling members in coupled relation.

4. A device of the character described comprising two detachable threaded members for engaging complemental threaded members, and two coupling members for preventing rotation of said detachable threaded members, said coupling members and detachable threaded members having coactive connecting portions adapted to permit relative sliding movement, and said coupling members having coactive coupling portions adapted to support them between said threaded members without sagging, one of said coupling members having provisions for receiving a sealing device for sealing the coupling members in coupled relation.

5. A device for locking a cover upon a meter or the like, comprising two detachable threaded members for engaging complemental threaded members of the meter to hold the cover on the meter, and two detachable coupling members, said coupling members and detachable threaded members being separable and consisting of ductile sheet metal, said detachable threaded members having wings and slots for the reception of said coupling members whereby the coupling members are capable of adjustment and whereby the detachable threaded members are held against rotation, one of said coupling members having a loop for the reception of a sealing device, and the other coupling member having an opening for the reception of said loop.

In testimony whereof I have affixed my signature, in presence of two witnesses.

GRANVILLE E. PALMER.

Witnesses:
 WALTER P. ABELL,
 P. W. PEZZETTI.